Nov. 5, 1968 J. D. WISHART 3,408,811
INTERNAL COMBUSTION ENGINES
Filed July 24, 1967 6 Sheets-Sheet 1

Inventor
John D. Wishart
by Sommers + Young
Attorneys

Nov. 5, 1968    J. D. WISHART    3,408,811
INTERNAL COMBUSTION ENGINES
Filed July 24, 1967    6 Sheets-Sheet 2

Inventor
John D. Wishart
by Sommers & Young
Attorneys

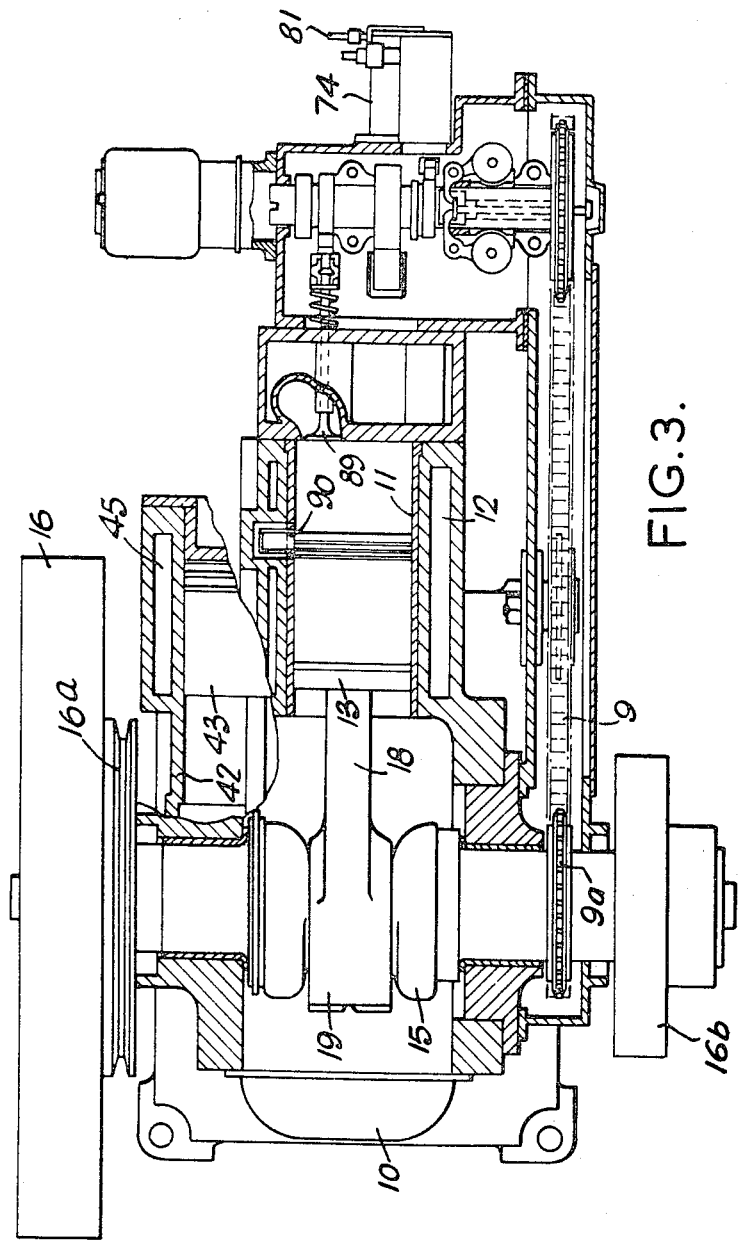

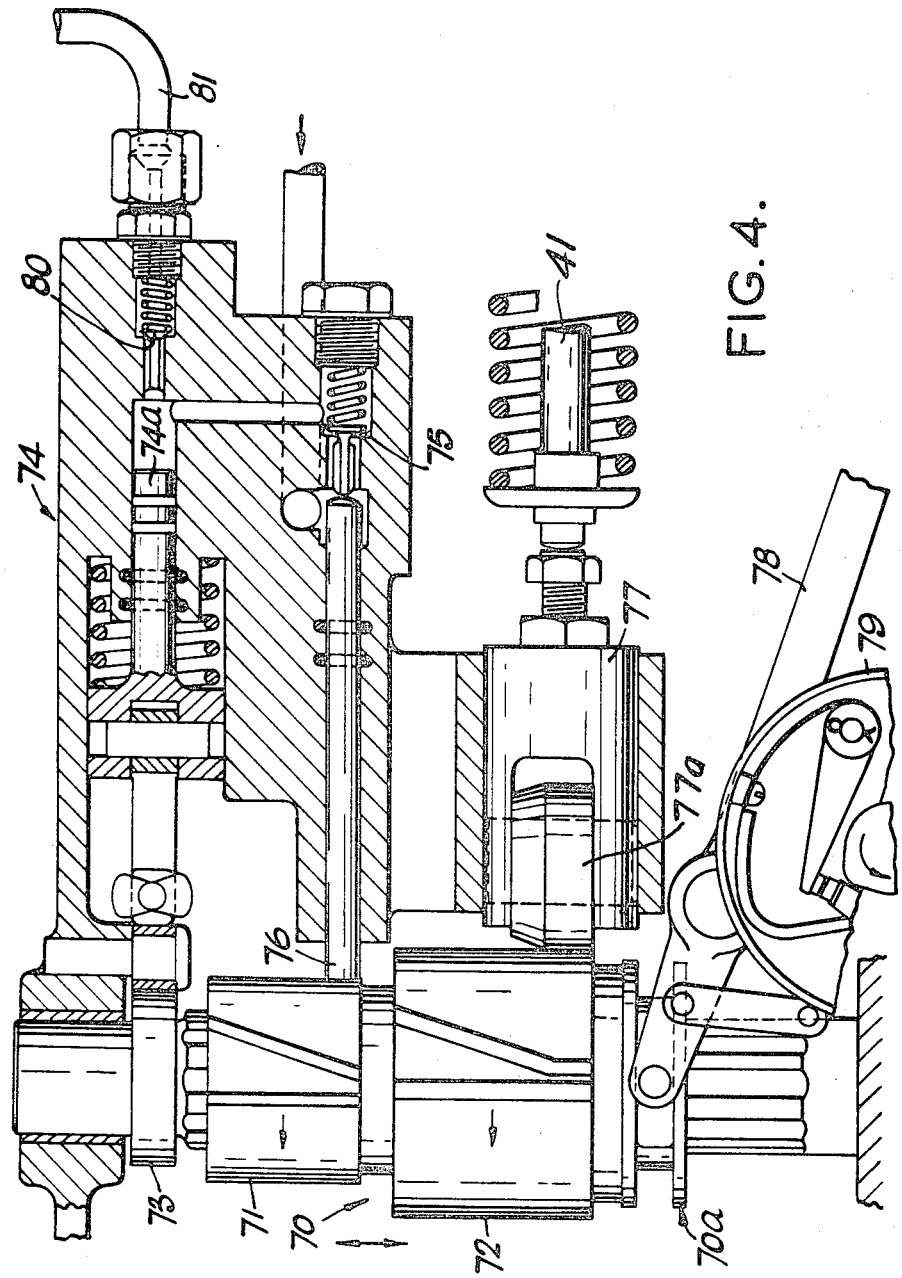

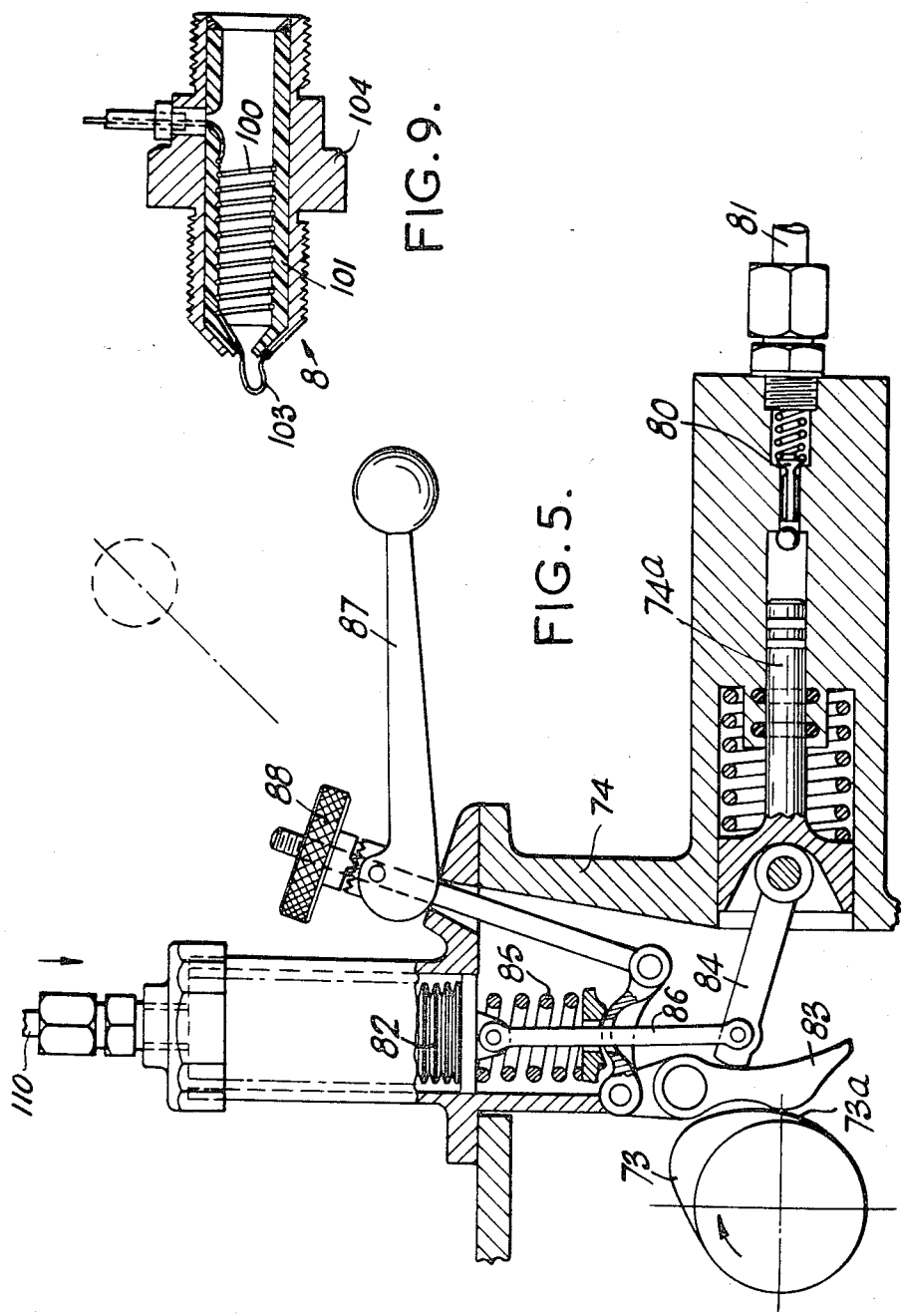

Nov. 5, 1968    J. D. WISHART    3,408,811
INTERNAL COMBUSTION ENGINES
Filed July 24, 1967    6 Sheets-Sheet 6
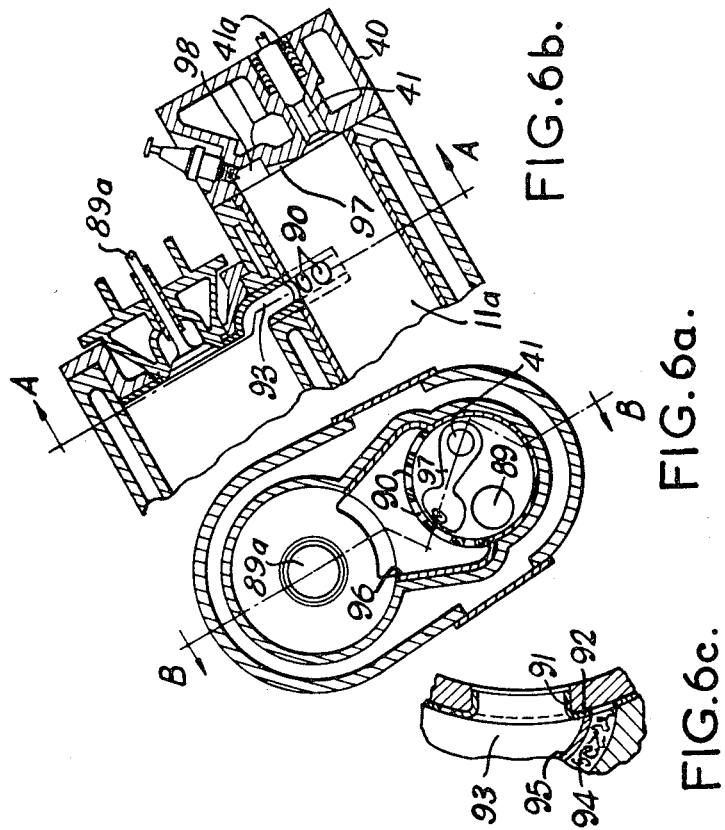
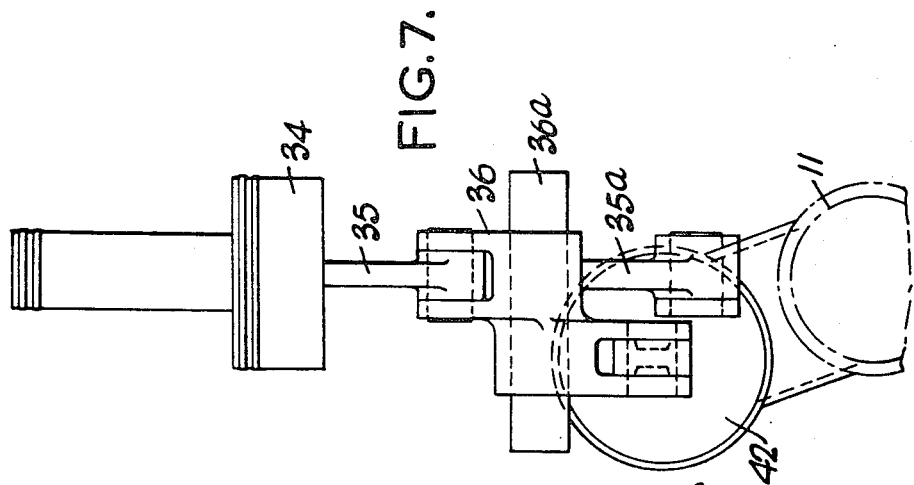
Inventor
John D. Wishart
by Sommers & Young
Attorneys 3,408,811
INTERNAL COMBUSTION ENGINES
John Donald Wishart, 93 Railway Road,
Blackburn, Victoria, Australia
Continuation-in-part of application Ser. No. 478,553,
Aug. 10, 1965. This application July 24, 1967, Ser.
No. 655,391
9 Claims. (Cl. 60—15)

ABSTRACT OF THE DISCLOSURE

Improved two-stroke internal-combustion engine which divides each precompressed air charge into a plurality of isolated streams to suppress backfiring and control temperature, pumps into the charge, proportionately to its rate of turbulent flow through a restricted passage into the explosion cylinder with variable cutoff after top dead center, a metered and vaporized fuel charge arranged to become stratified on entry, ignites it with a spark timed with relation to the cutoff point, and, after normal expansion, connects an auxiliary expansion cylinder to the explosion cylinder by an internally insulated port uncovered by its piston to obtain further expansion.

Prior art

This invention relates to internal combustion engines of the piston type which operate by spark plug ignition of a compressed charge of fuel and air, of the type described in my co-pending U.S. Application No. 478,553, filed August 10, 1965, and now abandoned, of which this is a continuation-in-part.

Universally used types of engines have in the past been constructed to work with both two strokes and four strokes per working cycle, which are known respectively as two-stroke and four-stroke engines. Both types admit the charge of fuel and air into the power cylinder where it is compressed by the piston before it is caused to ignite by an electric spark at the points of a spark plug.

Both known types are prone to spontaneous explosive ignition of the charge, which is generally referred to as "detonation." Detonation is harmful, and whether it will occur or not in an engine with any particular quality of fuel depends on both the temperature and pressure of the charge. These factors are complementary one to the other, but temperature has the more potent influence. When the charge of air and fuel is admitted into the cylinder, it immediately mixes with any hot residual exhaust gases which remain from the previous explosion, and compression of the charge occurs so rapidly that there is little opportunity for this heat, plus the cumulative heat caused by compression of the charge, to escape. Under these conditions, it closely follows that known as "adiabatic" compression, and it causes a large rise in the temperature of the charge as compression proceeds.

This temperature rise is objectionable, both because it increases the power required to compress the charge, and because it causes detonation to occur at a low compression pressure. Eliminating or modifying the heating effect of compression will enable engines to operate at higher, and therefore more efficient, pressures, which result is a major objective of the present invention.

The invention

The present invention is a method of deriving mechanical work from combustion gas in an internal combustion engine having an explosion cylinder, an auxiliary expansion cylinder and a piston in each cylinder, comprising the steps of fully compressing air externally of the explosion cylinder, passing the compressed air in finely divided streams through a heat exchanger whereby any accidental flame of a backfire from the cylinders is arrested and the temperature of the compressed air emitted from the heat exchanger is maintained below that at which detonation of the fuel used will occur and above the dew point thereof, injecting a predetermined quantity of fuel into the compressed air and inducing turbulence of the air by irregular high velocity flow prior to admission to the explosion cylinder, admitting the fuel air mixture to the explosion cylinder when the explosion piston is at or near top dead center, igniting said mixture whereby the explosion piston is moved towards bottom dead center, communicating the expansion cylinder with the explosion cylinder after the explosion piston has traversed a predetermined distance toward the bottom dead center position, and further expanding the combustion gas in both cylinders.

An engine to carry out the method is also provided according to the invention.

Conveniently, closing of the transfer valve is variable whereby the quantity of combustion gas admitted to the explosion cylinder is controlled to vary the power output.

Furthermore, the fuel supply and fuel ignition means are timed in direct relationship to the period of opening of the transfer valve.

The auxiliary expansion cylinder provides a simple and inexpensive means to utilize the pressure and expansive power remaining in the working gases at the end of the power stroke in the explosion cylinder. This available energy remaining in the gases is some 18% or more of the total available power of the burning charge, and its utilization will add a like amount to the power of the engine without any increase in its consumption of fuel or air.

In the past, efforts to make use of this extra power have usually caused trouble with overheated exhaust valves; although there are notable exceptions, such as exhaust driven turbochargers, where this overheating trouble is overcome by supplying excess air for the purpose of cooling the valves.

The expansion cylinder has a swept volume greater than that of the explosion cylinder, and is arranged as close as practicable alongside the explosion cylinder, and is fitted with a mechanically operated exhaust valve.

The exhaust port in the wall of the explosion cylinder connects with the head of the expansion cylinder through a short passageway, which is preferably heat-insulated on its inner surface to conserve exhaust heat. The expansion cylinder piston is timed in relation to the piston of the explosion cylinder so that when the port begins to be uncovered by the explosion piston, the expansion piston has already commenced to move down on its stroke. Expanding gases from the explosion cylinder enter the expansion cylinder during the whole period that the port is uncovered by the explosion piston, and drive the expansion piston for the greater part of the length of its power stroke before the port is again covered by the explosion piston as it moves up the explosion cylinder on the exhaust stroke. At this stage the pressure of the gases in both cylinders has fallen very considerably, and as soon as the port is covered the mechanically operated exhaust valve in the explosion cylinder opens to allow the spent gases from this cylinder to be evacuated by the rising piston.

At about the same time the mechanically operated exhaust valve in the expansion cylinder opens, to allow the spent gases from this cylinder to be evacuated by the rising piston.

An engine in which the fuel is mixed with highly compressed air prior to admission to the cylinder was proposed by Dugald Clerk in U.S. Patent No. 230,470 dated July 27, 1880. However, in Chapter 2 of the book, "The Gas Petrol and Oil Engine," Dugald Clerk admits that he was unable to suppress backfiring in that engine. The flame trap of the present engine is successful in completely extinguishing any flame of a backfire initiated in the precompressed air-fuel mixture.

For maximum economy, the present engine operates at a high compression pressure fixed by the engine designer after considering all factors except the incidence of detonation. Having fixed the compression pressure, the designer finds the temperature of the compressed charge at which detonation will occur in the engine when running on the selected fuel. There is then provided a combined heat-exchanger and flame trap with a plurality of narrow passages which will effectively damp out any flame from a possible backfire in the combustion chamber, and of a capacity large enough to directly control the temperature of the air after full compression, so that the combustible charge will always be kept below the temperature at which detonation will occur during combustion under any condition of engine operation. The temperature is controlled so that it will never be cool enough to prevent all the fuel evaporating before the passage of the spark. Cooling should not be overdone even when using gaseous fuels, for a loss of economy then occurs. With fuels which do not detonate readily, for instance methane gas, it may improve the economy if further heat is added to the air after compression by such means as utilizing heat from the exhaust gases. In such cases, the heat-exchanger must be arranged to heat the compressed air instead of cooling it. The high to low temperature variation with most fuels is wide, and for these a good design of heat-exchanger works effectively without any fine control device such as a thermostat. However, a thermostat for close control will be necessary when using fuels of both low volatility and low octane rating, such as the fuels commonly used in high-speed diesel engines.

An important aspect of the engine concerns the pulverizing of the droplets of fuel to form an extremely fine mist, and intimately mixing it with the combustion air as it enters the combustion chamber. Existing engines induce the charge into the cylinder barrel at low pressures, and a venturi in the carburetor combined with smooth flow through large valve ports and induction passages, are required if a full charge is to enter the cylinder barrel. Under these conditions pulverization of the fuel droplets and intimate mixing of air and fuel are difficult to attain, even when hot-spots and specially shaped induction pipes are used.

The present engine purposely admits the combustible charge into the combustion chamber with highly turbulent flow through a restricted passage and transfer valve to break up and pulverize the fuel droplets, and intimately mix the fuel with all the air. To limit a possible backfire, to the smallest extent, the passage between the heat-exchanger and the transfer valve is kept short to reduce the amount of combustible mixture outside the combustion chamber.

Due to the later point in the stroke at which peak explosion pressure occurs, the engine can cope with higher rates of turbulence than conventional types.

With conventional engines in which compression, firing, and expansion, all take place in one cylinder, the expansion ratio is automatically fixed by the compression ratio. The expansion ratio of the new engine is fixed by the engine designer independently of the compression ratio, and this flexibility of design is a valuable corollary to the efficiency of the engine.

The expansion ratio consists of the number of units in the total volume of the explosion and expansion cylinders, compared with the number of units in the volume of charge admitted to the combustion chamber on each stroke. This ratio is readily reduced by allowing a larger volume of charge to enter the cylinder head. This may easily be done by adjusting the timing to delay the closing of the transfer valve until the piston has moved a calculated further distance away from its top dead-center position. The spark usually occurs a few degrees of crank rotation before the transfer valve closes, to allow for the normal delay period of explosion after the passage of the spark.

Unlike the conventional engines, it is not necessary for all or any of the charge to be in the combustion chamber when the piston has reached its top dead center position. In fact, evacuation of a maximum of the exhaust products occurs when there is a minimum of clearance in the cylinder head at piston top dead center.

In the present engine, the rising piston forcibly ejects the burnt products of combustion from the cylinder throughout the complete exhaust stroke, through a conventional valve in the cylinder head.

The compression of atmospheric air to the full pressure required before ignition is accomplished by an air compressor isolated from the hotter power cylinder with its hot residual exhaust gases. The compressor may be driven by external means or it may be driven from the engine and it may be of any suitable type, rotary or otherwise.

The compressed air is admitted at its full compression pressure to the power cylinder as close to the top dead center position of the piston as a practical engine will allow, and the fuel, gaseous or liquid, is added immediately prior to its entry to the cylinder.

Preferably, there is provided means for causing an ignitable charge of fuel and air to surround the points of the spark plug, while the main body of the combustion chamber contains a mixture which may be of a different composition, usually weaker.

Such means comprise a symmetrical recess formed in the cylinder head opposite the transfer valve which admits the compressed air and fuel, said recess containing the ignition means such as a spark plug and possibly also the exhaust valve head. A channel is formed in the cylinder head between the transfer valve and the recess, the channel being narrow and deep where it enters the recess, and broad and shallow close to the transfer valve; a reservoir jet is provided to receive the correct amount of fuel for one charge and having an orifice of a size which will allow sufficient fuel to pass through it to immediately form a combustible mixture, or alternatively a fuel pump is provided which delivers fuel at the correct rate for combustion with the first of the entering air. The cylinder head is flat except for the channel and recess, arranged so that the flat head of the piston has only gasket clearance from it when on top dead center.

The first of the air, which has the correct amount of fuel to form a combustible mixture entrained therein, enters while the piston is very close to its top dead center position. Under these circumstances, the channel forms the main connecting passage from the vicinity of the transfer valve to the recess, and the entering charge rushes along it in a direct path to the recess, and to the spark plug points, after having taken a right angle turn into the channel and so lost much of its initial turbulence. As the piston moves down and vacates the main body of the combustion chamber, the later entering portion of the charge fills the space, and the receding piston head allows an unrestricted more direct flow of the turbulent air and fuel from the transfer valve, with little or none of this portion of the charge moving down the channel or losing its turbulence.

When ignition occurs, the recess holds most of its initial charge, which burns readily, and later ignites the remainder of the highly turbulent charge in the main body of te combustion chamber between the flat portion of the cylinder head, and the flat top of the piston.

The speed and power of the engine is controlled by varying the volume of the charge of air and fuel supplied to the combustion chamber on each cycle, while keeping the pressure of the compressed charge at a substantially constant high pressure. This improved method of charging the explosion cylinder, by variable cut-off of the charge supply immediately prior to its combustion on each cycle, is more direct and precise with a short time lag between the operation of the control means and the response of the engine. There are also only slight losses of thermal efficiency at light loads, compared with an engine using the more usual method of throttling the incoming charge.

Preferably, there is co-ordinated control of five factors which require to be varied at the same time to make variable cut-off effective in the engine.

These five factors are listed below;

1. The transfer valve, which admits the charge of precompressed air and its entrained fuel begins to open at a constant position of the piston stroke, and closes at positions which may be varied by a method to be fully described later.

2. The fuel pump has a corresponding constant beginning of delivery and a corresponding variable end of delivery.

3. The timing of the ignition spark is altered to match the variations in transfer valve timing, and this control must over-ride any speed governed control.

4. The fuel pump supplies fuel to the engine at an accelerating rate to match the accelerating rate of the charge entering the engine combustion chamber as it fills the space vacated by the piston, which moves at increasing speed from the top dead center position of its stroke. This rate of fuel delivery may be modified at the discretion of the engine designed to satisfy demands made by stratification of the charge; i.e., mixture richness layers or other considerations.

5. Compensation for the varying pressure of charge air comprising means actuated by the pressure of the air itself. By these means the length of stroke of the fuel pump plunger is varied such that the measure of fuel delivered is in direct relationship to the absolute pressure of compressed charge air.

One, or several transfer valves operating in unison, may be used for the, or each, explosion cylinder, and are disposed in a restricted area whereby the charge passes them at high velocity which thoroughly mixes the fuel and air.

These and other features of the invention will now be described in greater detail having reference to the accompanying drawings in which:

FIGURE 3 depicts a partial section taken through the explosion cylinder.

FIGURE 4 depicts a cam arrangement for operation of the fuel pump, transfer valve and contact breaker according to an embodiment of the invention.

FIGURE 5 depicts a further view of the fuel pump output control.

FIGURE 6a depicts a section plan view taken on line A—A of FIGURE 6b of the respective cylinder heads of expansion and explosion cylinders and porting therebetween.

FIGURE 6b depicts a sectional side view taken on line B—B of FIGURE 6a.

FIGURE 6c depicts an enlarged part sectional view of an exhaust port showing the heat insulating and lining.

FIGURE 7 depicts a view of the compressor piston and connecting linkage disposed relative to the explosion and expansion cylinders.

FIGURE 9 is a detailed view of the fuel injector nozzle.

Figures 1, 8:
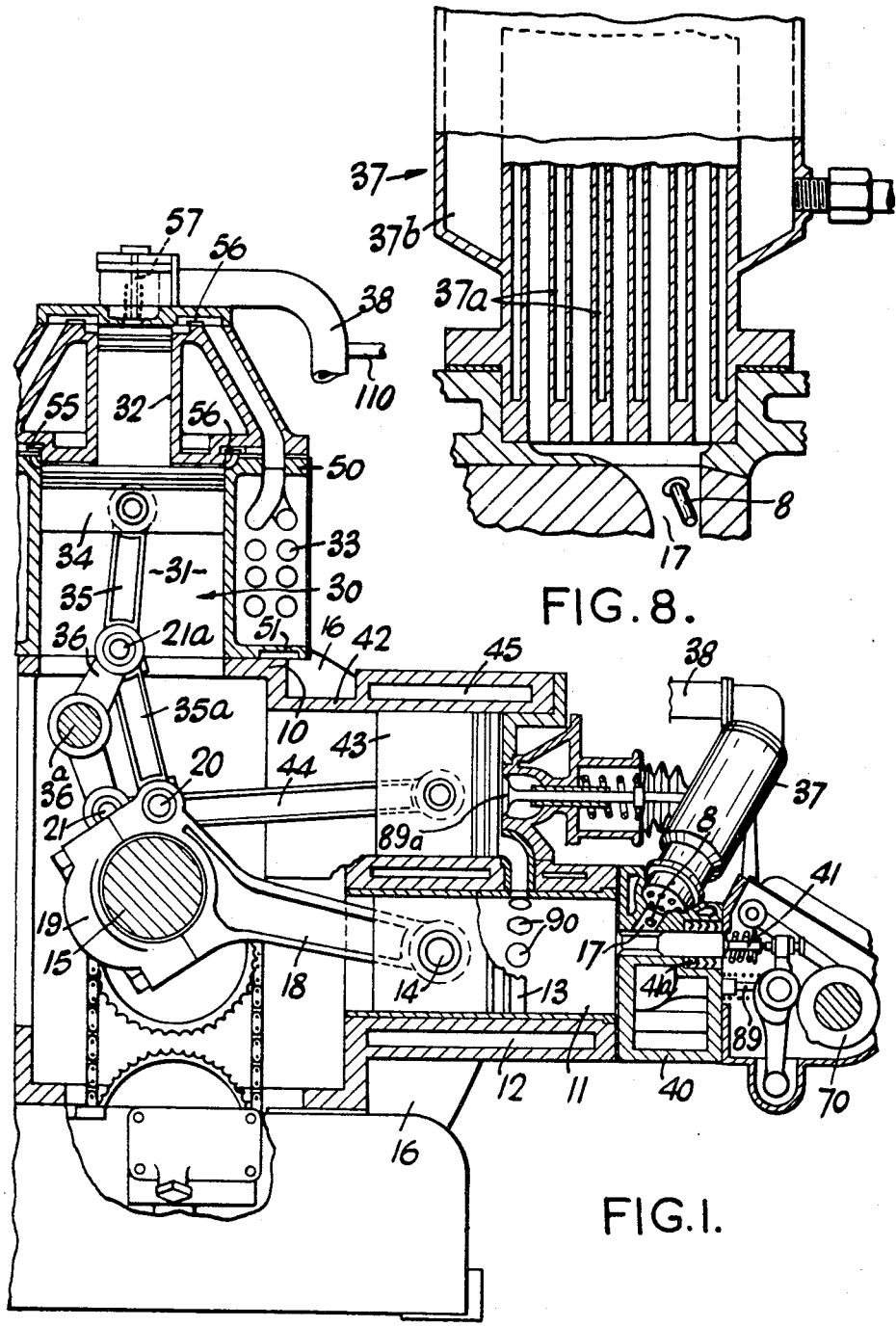
FIGURE 1 depicts a partial sectional view of the major components of one type of engine according to the invention. The section is taken along the longitudinal axes of the compression, explosion, and expansion cylinders.
FIGURE 8 is a detail view of the combined heat exchanger and flame trap.

Referring to FIGURE 1 of the drawings, the engine has a crankcase 10, an explosion cylinder 11, which is fluid cooled by a fluid jacket 12, a piston 13, and a gudgeon pin 14 and crankshaft 15 of conventional pattern. Crankshaft 15 is connected to a flywheel 16 (see FIG. 2). A connecting rod 18 connecting the piston 13 to the crankshaft 15, has a big end 19 which is provided with a supplementary wrist-pin connection 20.

An air compressor, indicated generally by 30, is mounted on the crankcase 10 above the crankshaft 15, and preferably comprises two stages, viz: a low pressure cylinder 31 and high pressure cylinder 32, and a unitary construction piston 34 working in both cylinders. Links 35 and 35a connect the compressor piston 34 with wrist pin 20 on connecting rod 18, and with bell crank 36 pivoted about rocker shaft 26a secured in the crankcase.

An intercooler 33 is located between the low pressure cylinder 31 and the high pressure cylinder 32, and a heat exchanger 37 is located between an outlet pipe 38 from the high pressure cylinder 32 and the cylinder head 40 of the engine.

The combined flame trap and heat exchanger 37 comprises a plurality of tubes 37a (see FIG. 8) surrounded by heat exchange fluid which may be cooled by heat exchange with the cooling water, or heated by exhaust products from the engine or other means passed through the jacket 37b.

The tubes 37a for the air, are of a greater number and smaller in area than would be required for normal heat exchange.

In one example the tubes may have a bore of $\frac{3}{16}''$, be $7\frac{1}{2}''$ long, and be 19 in number. This is to enable them to cope with the abnormal conditions of a backfire, at which time the heat exchanger must act as a high capacity heat absorber to efficiently suppress any flame generated under the difficult conditions of a great production of heat in a small space.

With the type of engine shown in FIGURE 1, using low octane petroleum fuel such as kerosene or the like, the operating temperature of the compressed charge is around 212° F. This temperature is maintained by circulating around the tubes 37a of the heat-exchanger all or portion of the jacket water as it leaves the engine cylinder. In this case the one thermostat in normal use on the engine cooling system will control the temperature of both the engine and the heat-exchanger. When the fuel used is of very high octane rating, such as methane gas, the most efficient temperature will be considerably higher than 212° F., and heat transfer liquid of the special type used in heat-exchangers must then be used, heated by means of waste exhaust gas if the temperature of the air as it leaves the compressor is too low, or cooled by water from the cooling system if cooling is needed. In either case a thermostat is the most convenient method of controlling the rate of circulation of the heat exchange fluid, and by this means the temperature of the air is kept within the desired limits.

The cylinder head 40 comprises a transfer valve 41 opening into explosion cylinder 11, the stem of the valve 41 being packed by a stuffing box as at 41a.

Figure 2:
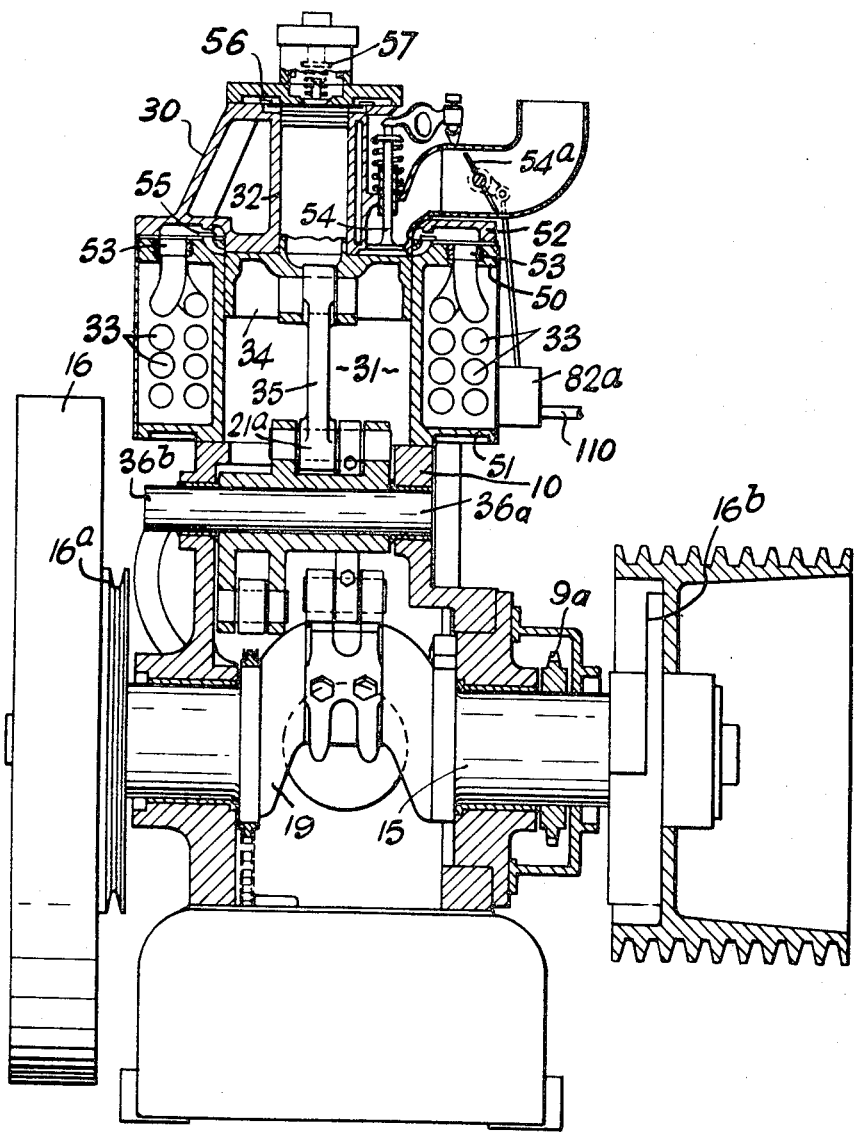
FIGURE 2 depicts a partial section viewing from the crankshaft.

It is to be understood that the engine, in all or any of its forms, is a 2 cycle engine so that the cams which actuate both the transfer and exhaust valves, are driven at crankshaft speed directly from the crankshaft or through the chain 9 and sprocket drive 9a (see FIGS. 2 and 3).

The piston 43 in the expansion cylinder 42 is connected by link 44 to wrist pin 21 on bell crank 36. The expansion piston is phased with a motion 100° of crank angle lagging the explosion piston 13 motion and the expansion cylinder 42 lies adjacent and parallel with, the explosion cylinder. Thus, the expansion piston 43 is connected to the crankshaft 15 via the bell crank 36 and links 44 and 35a. Similarly the compressor piston 34 is connected to the crankshaft 15 via links 35 and 35a through bell crank wrist pin 21a.

The compressor piston 34 is made the same weight as is the explosion piston 13 and its plane of motion is at right angles to the plane of motion of the explosion piston 13. Weights on the power take off flanges 16a, 16b (see FIG. 2) at each end of the crankshaft 15, fully balance both pistons. The piston 43 of the expansion cylinder 42 is of light weight and need only be half balanced for normal speeds of operation in the usual manner. Provision is made for fully balancing the expansion piston 43, if high engine speeds are desired, by means of a weight attached to a lever on the protruding end 36b of the rocker shaft 36a on which the bell crank lever 36 pivots. The expansion cylinder 42 is water cooled in the normal manner through water jackets 45.

As shown in FIGS. 1 and 8, a fuel injection nozzle 8 is provided, and is located as close to the transfer valve inlet openings as practicable. Preferably also, there is a restricted space 17 in the air supply passage from the heat-exchanger 37, as close as possible to the transfer valve 41, allowing only the minimum volume which will pass the required amount of air. Into this restricted space 17, the nozzle 8 projects to supply the fuel from the fuel pump 74 through pipe 81 at the moment when the compressed air is entering the combustion chamber 11. The blast of air passing the nozzle 8 and through the open transfer valve 41 pulverizes the fuel droplets and mixes with the vaporizing fuel in a very efficient and complete manner. Control of the compressor intake is by any known method but is preferably as shown by means of a butterfly valve 54a in the air intake to the compressor 30 (see FIG. 2). The bellow means 82a, acting in a manner similar to bellow means 82 (hereinafter described), are provided to actuate the butterfly valve 54a. Bellow means 82a, through a simple linkage system, controls the incoming air passing butterfly valve 54a to maintain the charge air at optimum pressure which in a practical engine is subject to fluctuations.

The absolute pressure of the charge air varies in direct ratio with the amount of air passing the butterfly valve 54a to the compressor cylinder, so the fuel supplied during each stroke of the fuel pump 74 must also vary in this same ratio in a manner to be described hereinafter in detail.

The compressor 30 is detachable with the high pressure cylinder 32 mounted tandem over the larger diameter low pressure cylinder 31. In the example the compressor cylinders have bores of 5¾" and 2⁵⁄₁₆" by a stroke of 3½". The large flanges 50 and 51 at the ends of the low pressure cylinder 31 provide water space for the intercooler tubes 33 spaced at 90° intervals around top flange 50 and attached by flared ends and screwed nipples 53. The high pressure cylinder 32 has a large lower flange, which contains the inlet and outlet valves for low pressure cylinder 31. At least one poppet type admission valve 54 (see FIG. 2) is used to admit air to the cylinder 31, and is operated mechanically through a rocker arm and push rod from a cam lobe (not shown) on the crankshaft 15. This arrangement is adopted to obtain consistent high volumetric efficiency at all speeds of the engine. The low pressure delivery valve 55 is of annular disc form of well known type. The admission valve 56 to the high pressure cylinder is a smaller annular disc of the same type. The high pressure delivery valve 57 is in the center of the uncooled head and is of lightweight automatic poppet type spring loaded. This valve type is reliable under the hot conditions prevailing and where leakage cannot be tolerated.

Referring to FIGURES 4 and 5, variable cut-off admission of the charge is obtained by arranging for sideways movement of the specially shaped cam referenced generally at 70 which operates the transfer valve 41. The term "sideways movement" is to be understood to mean the movement which will cause a relative sideways displacement of the cam in relation to its cam-follower, and this may be obtained by sideways displacement of either the cam or the followers. The cam 72 has a wide leading flank which gives uniform lift along its full width.

Its correspondingly wide trailing flank is a series of separate cam forms arranged to hold the transfer valve 41 open for longer and longer periods; or alternatively, the whole flank is cut at an angle (as shown), which will give an appropriately shaped cam-follower 77a the motion causing the same longer and longer periods of opening but by gradual increase instead of by a series of steps.

When the sideways movement is effected to lengthen the period of transfer valve opening, and so allow more compressed air at the same pressure to enter the combination chamber of the engine, the amount of fuel must also be increased in the same proportion as the increase in air volume.

Having reference to FIGURES 4 and 5, the preferred method of controlling the amount of fuel admitted to the engine is to cause the same mechanism which gives the transfer valve cam sideways movement to also give fuel pump inlet valve cam 71 sideways movement to control the period of fuel delivery from the pump 74. It does this by holding the pump inlet valve 75 open, except for the period when the pump is delivering fuel into the airstream. The cam 71 is arranged in a similar manner to the cam 72 to cause delivery of fuel to begin at a fixed point, and to cease at various points which will allow the correct volume of fuel to be delivered to match the volume of air entering the combustion chamber. The difference is, of course, that cam 71 causes a fall of cam follower 76 coincident with a rise of the follower 77.

The timing of the ignition spark must be adjusted to match the variations in transfer valve timing, and means operable to rotate the contact breaker 79 to vary the timing is attached to the control apparatus 70a which simultaneously operates the sideways movement of the cams 71 and 72 mentioned above. The movement of this control apparatus 70a originates at the engine speed governor, or at any alternative means for controlling the engine speed and power such as a manually operated accelerator pedal or lever 78.

The fuel pump 74 must supply fuel to the engine at the same proportionate rate as that of the compressed air entering the combustion chamber. This requires the speed of movement of the fuel pump plunger 74a to be accelerated at the same relative rate as the increasing rate of the explosion piston 13 from its top dead center position. The pump plunger 74a is driven from a fixed cam 73 of its own, and this has a leading flank 73a shaped to give the plunger 74a the correct speed it requires at all parts of its full stroke. Its lift has excess movement at both ends of the plunger stroke to allow the pump inlet valve 75 to control the beginning and end of pump delivery as explained above. The pump 74 delivers the fuel through a non-return valve 80 and pipe 81 to the fuel nozzle 8.

In order to minimize the effect of unavoidable fluctuations of pressure output from the compressor and the altered weight of air for the same volume caused by such variation, the length of fuel pump plunger stroke per degree of rotation of its cam 73 is caused to vary in the same proportion as the absolute pressure of air entering the combustion chamber.

The means provided to regulate the pump plunger stroke per degree of cam revolution makes use of the changing air pressure in compressor outlet pipe 38 to act on a spring 85 on the metal bellows 82 connected through pipe 110 or an air cylinder piston (not shown) the motion of which adjusts the stroke length. Pipe 110 is also common to bellows 82a. The preferred method is to arrange a pivoted cam follower 83 to operate the pump plunger 74a through link 84 from the various positions along its length which correspond with the desired length of stroke. The link 84 is movable by expansion and contraction of the bellows 82 through the link 86. Upon the expansion of the bellows 82, the stroke of the plunger is increased due to a greater amplitude of movement transmitted by cam follower 83.

The tension of spring 85 is adjustable in two ways; quick and approximate adjustment by movement of lever 87 or fine adjustment by threaded screw 88. Thus, the mixture strength can be manually controlled according to the bias of spring 85.

The explosion and expansion cylinders each have a mechanically operated exhaust valve 89, 89a of known type in the cylinder head, operating on each return stroke of the pistons. There are also supplementary exhaust ports 90 in the wall of the explosion cylinder uncovered by the explosion piston when near its bottom dead center position.

The hot gases in the explosion cylinder have considerable pressure energy remaining in them when the piston uncovers the ports, and use is made of this energy by the present engine to provide extra usable power. In order to conserve this heat energy, the hot gas is insulated from the relatively cool metal which surrounds the cylinder and port walls, as it passes through the ports. The construction of the ports 90 and duct 93 will now be described with reference to the accompanying FIGURES 6a, b and c.

The explosion cylinder is lined with a detachable sleeve 11a of either "dry" or "wet" type. The dry type is shown, and it has ports 90 drilled through its wall in a row at the opening of the duct 93. Each port 90 is shrouded with a lining of heat resistant metal 91 such as stainless steel. These lining shrouds 91 are made in the shape of eyelets with a flange 92, and are inserted into the ports 90 from the duct 93 after the sleeve 11a is in place. The flange 92 on each shroud 91 is held in place by metal shield 95 to prevent it from moving away from the sleeve 11a.

The duct 93 is of rectangular section having even depth, but narrowing down in width after it leaves the cylinder sleeve 11a.

It is made larger than is required to pass the gas flow, to allow room for a layer of insulating material 94 at the port walls, said material 94 being covered by the heat resisting metal shield 95. The shield 95 is split longitudinally at an angle which will allow the part with the greatest width near the sleeve 11a to be inserted into position through the narrow end 96 of the duct 93. The remaining part of the shield 95, when placed in position alongside and located to the first, holds both parts, and the shrouds 91 in position. The space between the shield 95 and the duct walls may be filled with flowable and settable insulating material 94 such as liquid porcelain inserted by known means such as a pressure gun through small holes in the shield, and it later sets hard.

Referring particularly to FIGURES 6a and 6b there is shown means for stratifying the incoming charge mixture of fuel and air whereby the recess 98 around the sparking plug may have a richer mixture than the remainder of the combustion chamber. A channel 97 is formed in the cylinder head 40 extending between said recess 98 and inlet port of valve 41. The initial incoming charge at or near top dead center of the explosion piston 13 moves along the channel 97 into recess 98 and remains there in a relatively non-turbulent condition, while the now receding piston allows a direct flow of turbulent air into the combustion chamber thus formed which, depending upon the amount of fuel administered, may be weaker than the initial charge remaining in the recess 98. When ignition occurs, the initial charge burns readily and later quickly ignites the remainder of the highly turbulent charge above the explosion piston 13.

There are also provided means for causing the fuel, which may be of a non volatile nature when cold to be vaporized before, or immediately after, it leaves the jet, so that the engine can be readily started up under cold conditions.

Such means (see FIG. 9) comprise an electric heating coil 100 of resistance wire wound into a helix with an internal diameter approximately the same as the fuel supply pipe 81 from the pump 74. This helix is threaded into a mating groove formed on the inside of a tube 101 made of porcelain or other heat resisting and electric insulating material. The tube 101 with its internal coil 100 is located in a metal casing 104 to form the injection nozzle 8, which directs the fuel into the air stream. Provision is made to pass an electric current through the coil 100 from a battery or other source. The electric current heats the coil, and is of sufficient wattage to vaporize all, or at least an appreciable amount, of the fuel which passes along the nozzle into the air about to enter the combustion chamber.

A portion 103 of the heating coil 100 extends outside the nozzle 8 for the purpose of igniting some of the fuel as it mixes with the passing air.

The electric current is switched on prior to starting up a cold engine, and when the engine is running and warm, it is switched off or reduced.

The engine herein illustrated and described is of single crank form, but it must be understood that the invention is not restricted to this form. Engines of any number of cranks, with the same plurality of explosion and expansion cylinder pairs, may be constructed. Each pair of explosion cylinders may be readily supplied from one flame-trap, fuel nozzle, and fuel pump if their respective transfer valve inlets are arranged close together so that the combustible charge may be alternatively supplied to each from one heat exchanger and fuel nozzle.

I claim:

1. A method of deriving mechanical work from combustion gas in an internal combustion engine having an explosion cylinder, an auxiliary expansion cylinder and a piston in each cylinder, comprising the steps of fully compressing air externally of the explosion cylinder, passing the compressed air in finely divided streams through a heat exchanger whereby any accidental flame of a backfire from the cylinders is arrested and the temperature of the compressed air emitted from the heat exchanger is maintained below that at which detonation of the fuel used will occur and above the dew point thereof, injecting a predetermined quantity of fuel into the compressed air and inducing turbulence of the air by irregular high velocity flow prior to admission to the explosion cylinder, admitting the fuel air mixture to the explosion cylinder when the explosion piston is at or near top dead center, igniting said mixture whereby the explosion piston is moved towards bottom dead center, communicating the expansion cylinder with the explosion cylinder after the explosion piston has traversed a predetermined distance toward the bottom dead center position, and further expanding the combustion gas in both cylinders.

2. An internal combustion engine of the reciprocatory two stroke type comprising an explosion cylinder, an auxiliary expansion cylinder, a piston in each cylinder, exhaust valves in each cylinder, a crankshaft connected to each piston by connecting link means to rotate in response to reciprocation of the pistons, a restricted passage through which air passes to enter the explosion cylinder and which is shaped to induce turbulence in said air, a transfer valve controlling admission of air from the restricted passage to the explosion cylinder, a compressor to compress the air prior to admission to the explosion cylinder, a heat exchanger interposed between the compressor and the restricted passage to maintain the air at a temperature above the dew point of the fuel and air mixture and below the temperature at which detonation will occur in the explosion cylinder during ignition, said heat exchanger including a plurality of small bore passages through which the air is passed and disposed and proportioned to form a flame trap to arrest the flame of a back fire, a fuel nozzle to supply fuel to the turbulent air in the restricted passage, a fuel pump to supply fuel to the fuel nozzle, ignition means to ignite the fuel air mixture in the explosion cylinder, control means to coincidentally vary the period of opening of the transfer valve and duration of admission of fuel to vary the power output, ports communicating the expansion and explosion cylinders and opened by the explosion piston after it has travelled a predetermined distance from top dead center, the connecting link means between the pistons and the crankshaft being arranged so that the combustion gases are further expanded in the expansion cylinder after opening of the ports.

3. An engine according to claim 2, wherein the ignition means are operably connected to the control means to vary the time of ignition in response to variation in period of opening of the transfer valve.

4. An engine according to claim 2, wherein means are provided for varying the quantity of fuel delivered by the pump to the fuel nozzle in proportion to variation in pressure of air.

5. An internal combustion engine according to claim 2, wherein said control means comprise two interconnected cams slidably mounted on a shaft driven from the crankshaft, said cams driving cam followers which actuate said transfer valve and an inlet valve to the fuel pump, said cams having contoured lobes to vary the duration of lift of the cam followers upon displacement of the cams along said shaft.

6. An engine according to claim 2, wherein the explosion cylinder piston is directly connected to the crankshaft by a connecting rod, and the expansion cylinder piston is connected by a link to one arm of a bell crank, the other arm of the bell crank being connected by a link to the end of said connecting rod which is connected to said crankshaft.

7. An engine as claimed in claim 2, wherein the ports communicating the explosion cylinder to the expansion cylinder include a duct wall formed of insulating material to restrict heat loss as the combustion gasses pass therethrough.

8. An engine as claimed in claim 2, wherein the cylinder head of the explosion cylinder includes a recess and a channel through which the fuel air mixture initially entering the cylinder flows from the transfer valve to the recess, and the ignition means includes a spark plug located in said recess.

9. An engine as claimed in claim 2, wherein the fuel nozzle includes an electric element to heat the fuel passing through said nozzle, said element including a portion disposed in the path of fuel issuing from said nozzle into the restricted passage.

References Cited

UNITED STATES PATENTS

| | | | |
|---|---|---|---|
| 982,850 | 1/1911 | Noyes | 60—15 |
| 1,825,522 | 9/1931 | Johansson | 60—15 |
| 2,295,619 | 9/1942 | Wydler. | |
| 2,559,484 | 7/1951 | Waring | 60—15 |
| 2,594,845 | 4/1952 | Baumann | 123—68 |

MARTIN P. SCHWADRON, *Primary Examiner.*

C. B. DORITY, *Assistant Examiner.*